United States Patent [19]

Dunski

[11] Patent Number: 4,722,956

[45] Date of Patent: Feb. 2, 1988

[54] STABILIZED BLOCK COPOLYMER COMPOSITIONS CONTAINING RING-SUBSTITUTED N-ACYL-PARA-AMINOPHENOL

[75] Inventor: Neil Dunski, Creve Coeur, Mo.

[73] Assignee: Mallinckrodt, Inc., St. Louis, Mo.

[21] Appl. No.: 938,941

[22] Filed: Dec. 8, 1986

Related U.S. Application Data

[63] Continuation of Ser. No. 782,824, Oct. 2, 1985, abandoned.

[51] Int. Cl.$^4$ .............................................. C08K 5/20
[52] U.S. Cl. ..................................... 524/222; 525/314
[58] Field of Search ............... 524/222, 224; 526/340; 525/314

[56] References Cited

U.S. PATENT DOCUMENTS

| | | | |
|---|---|---|---|
| Re. 28,236 | 11/1974 | Hendricks et al. | 36/2.5 R |
| 3,285,855 | 11/1966 | Dexter et al. | 252/57 |
| 3,400,099 | 9/1968 | Cook | 524/222 |
| 3,594,452 | 7/1971 | De La Mare et al. | 260/880 |
| 3,595,942 | 7/1971 | Wald et al. | 260/880 |
| 3,644,482 | 2/1972 | Dexter et al. | 260/473 R |
| 3,810,957 | 5/1974 | Lunk | 525/98 |
| 3,870,676 | 3/1975 | Condon | 525/98 |
| 4,025,487 | 5/1977 | Dexter et al. | 524/222 |
| 4,107,124 | 8/1978 | Hines | 524/425 |
| 4,660,858 | 4/1987 | Flanasan | 281/21 R |

FOREIGN PATENT DOCUMENTS

| | | |
|---|---|---|
| 40-13263 | 6/1965 | Japan . |
| 6505775 | 11/1965 | Netherlands . |
| 1083502 | 9/1967 | United Kingdom . |
| 1085957 | 10/1967 | United Kingdom . |
| 1096194 | 12/1967 | United Kingdom . |
| 189773 | 1/1967 | U.S.S.R. ............. 260/404 |

OTHER PUBLICATIONS

CA 106:6105s (1987).
CA 105:227979m (1986).
CA 105:192341z (1986).
CA 105:192253r (1986).
CA 105:173822j (1986).
CA 105:173794b (1986).
CA 105:79991s (1986).
CA 105:61531g (1986).
CA 105:7567k (1986).

Primary Examiner—Veronica P. Hoke
Attorney, Agent, or Firm—R. J. Klostermann; L. N. Goodwin; V. Peoples, Jr.

[57] ABSTRACT

Disclosed are stabilized A-B-A type block copolymer compositions containing at least two monoalkenyl arene polymer end blocks and at least one polydiene internal block and a stabilizing amount of a ring-substituted N-acyl-para-aminophenol. In two preferred embodiments, the latter compound is N-stearoyl-2,6-di-t-butyl-4-aminophenol, while the block copolymers are polystyrene-polybutadiene-polystyrene and polystyrene-polyisoprene-polystyrene, respectively.

21 Claims, No Drawings

STABILIZED BLOCK COPOLYMER COMPOSITIONS CONTAINING RING-SUBSTITUTED N-ACYL-PARA-AMINOPHENOL

This is a continuation of application Ser. No. 782,824 filed Oct. 2, 1985, now abandoned.

The present invention relates to a polymeric composition comprising a block copolymer of the A-B-A type and a stabilizing amount of a ring-substituted N-acyl-para-aminophenol.

Japanese Pat. No. Sho 40 [1965]-13263 discloses polyolefin compositions stabilized with respect to high temperatures by mixing polyolefins with N-substituted-2,6-dialkyl-4-aminophenol compounds. N-stearoyl-2,2,6-di-t-butyl-4-aminophenol (hereinafter referred to as "di-t-Bu-SPAP" and sometimes simply as "DTB-SPAP") is mentioned therein among "typical examples" of the compounds (translation pages 3–5). The term "polyolefins" is defined in the Japanese patent as "polymers or copolymers of ethylene, propylene, butene, pentene, styrene, etc. . . . " (translation page 8). However, there is no disclosure therein of a block copolymer of the A-B-A type stabilized with DTB-SPAP.

Himes, U.S. Pat. No. 4,107,124 describes polymeric compositions containing polymers of the A-B-A type containing IRGANOX® 1010, described by Himes as an "antioxidant covered by U.S. Pat. Nos. 3,285,855 and 3,644,482." (These three U.S. patents, as well as the above Japanese patent are incorporated herein by reference.) IRGANOX® 1010 is principally tetrakis(-methylene 3-(3',5'-di-tert-butyl-4'-hydroxyphenol)propionate)methane (hereinafter referred to sometimes as "TMDTB-HPPM"). There is no disclosure in Himes of a polymeric composition containing any other antioxidant in lieu of TMDTB-HPPM.

Unfortunately, TMDTB-HPPM has not been entirely satisfactory for stabilizing A-B-A type block copolymers, such as polystyrene-polyisoprene-polystyrene and polystyrene-polybutadiene-polystyrene, against degradation, such as oxidative and thermal degradation. Accordingly, there is a substantial need in the art for stabilized A-B-A type block copolymer compositions having improved stability or resistance to degradation, such as oxidative and thermal degradation.

The present invention substantially fulfills the above need by stabilizing A-B-A type block copolymers containing at least two poly(monoalkenyl arene) end blocks and at least one polydiene internal block against oxidative and thermal degradation with a stabilizing amount of a ring substituted N-acyl-para-aminophenol, for example, DTB-SPAP.

DESCRIPTION OF THE INVENTION

Generally stated, the present invention provides a stabilized polymeric composition comprising:

(A) a block copolymer having at least two monoalkenyl arene polymer end blocks A and at least one elastomeric conjugated diene internal block B, said blocks A preferably comprising from about 8 to about 65% by weight of the copolymer; and (B) a stabilizing amount of a ring substituted N-(aliphatic acyl)-para-aminophenol containing at least one substituent $R_1$ in the ortho position relative to the hydroxyl group of the phenol moiety, wherein the aliphatic acyl group contains from about 2 to about 22 carbon atoms, and $R_1$ is an acyclic or cyclic alkyl group which may be, for example, an acyclic alkyl group containing from 1 to about 8 carbon atoms or a cycloalkyl group containing from 5 to about 12 carbon atoms.

DETAILED DESCRIPTION OF THE INVENTION AND OF THE MANNER AND PROCESS OF MAKING AND USING IT

The block copolymers employed in the present composition are thermoplastic elastomers having at least two thermoplastic monoalkenyl arene polymer end blocks A, which may be, for example, polystyrene (preferred), and at least one elastomeric conjugated diene polymer internal block B, which may be, for example, polybutadiene (preferred) or polyisoprene (also preferred). In such copolymers containing only one internal block B, the term "midblock" refers to such internal block. The block copolymer may contain any suitable number of blocks and its macromolecular configuration may be linear, graft or radial (branched) depending upon the method by which the block copolymer is formed. The block copolymer may have the linear configuration $A\text{-}(\text{-}B\text{-}\text{-}A)_n$ where A and B are as defined above and n varies from 1 to 15. Radial block copolymers are preferred. Illustrative (and preferred) block copolymers of linear configuration have the structures polystyrene-polyisoprene-polystyrene and polystyrene-polybutadiene-polystyrene. Illustrative radial block copolymers include a single such diene block B having three or more branches, the tip of each branch being connected to a monoalkenyl arene polymer end block A such as polystyrene, as described in U.S. Pat. No. 3,594,452. In addition to styrene (preferred), other useful monoalkenyl arenes from which the thermoplastic (non elastomeric) blocks may be formed include alphamethyl styrene, tert-butyl styrene and other ring alkylated styrenes as well as mixtures thereof. The conjugated diene monomers from which the internal blocks may be formed preferably have 4 to 5 carbon atoms such as butadiene and isoprene. Each of the blocks may have any suitable average molecular weight. The monoalkenyl arene polymer blocks preferably have number average molecular weights from about 5,000 to about 125,000, more preferably from about 15,000 to about 100,000. The elastomeric conjugated diene polymer blocks preferably have number average molecular weights from about 15,000 to about 250,000, more preferably from about 25,000 to about 150,000. The average molecular weights of the end blocks are determined by gel permeation chromatography, whereas the end block content of the copolymer is measured by infrared spectroscopy. The weight percentage of the thermoplastic monoalkenyl arene blocks in the finished block copolymer is preferably from about 8 to about 65%, more preferably from about 30% to about 50% by weight. The general type and preparation of these block copolymers are described in U.S. Pat. No. Re. 28,246.

Block copolymers includable as the block copolymer component of the composition of this invention may be hydrogenated either selectively, randomly or completely. Selective conditions may be employed, for example, to hydrogenate the elastomeric diene internal block or blocks while not so modifying the monoalkenyl arene polymer blocks. Two examples of hydrogenated polymers are polyvinylcyclohexane-hydrogenated polyisoprene-polyvinylcyclohexane and polystyrene-hydrogenated polybutadiene-polystyrene. Preferably, blocks A are characterized in that no more than about 25% of the original aromatic double bonds are reduced by hydrogenation while blocks B are characterized by having at least 75% of the aliphatic double bonds reduced by hydrogenation as described generally in U.S. Pat. No. 3,595,942.

The ring-substituted N-acyl-para-aminophenol, which may be employed alone as the stabilizer component of the composition of this invention, includes an aliphatic acyl group. The number of carbon atoms in the acyl group may be, for example, from about 2 to about 22, preferably from about 12 to about 18 and more preferably from about 14 to about 18.

Examples of aliphatic acyl groups suitable for use herein are caproyl, valeroyl, nonanoyl, lauroyl, myristoyl, palmitoyl, stearoyl, and oleoyl. The acyl group is preferably stearoyl or palmitoyl, and more preferably is stearoyl. Mixtures of such ring-substituted N-acyl-para-aminophenols may be employed as the stabilzer component. Mixtures of such aminophenols containing acyl groups of palmitic acid and stearic acid, respectively, are highly suitable. Compounds suitable for use as the stabilizer and methods for preparing the compounds are well known. The compounds can be prepared, for example, by the method described in published Dutch Patent Application No. 6505775.

The stabilizer compound contains at least one substituent $R_1$ in the ortho position relative to the hydroxyl group of the phenol moiety, wherein $R_1$ is an acyclic or cyclic alkyl group, which may be, for example, an acyclic alkyl group, which may contain, for example, from 1 to about 8 carbon atoms, or a cycloalkyl group, which may contain, for example, from about 5 to about 12 carbon atoms. $R_1$ is preferably a tertiary alkyl group and more preferably is t-butyl.

Acyclic alkyl groups which can be present as $R_1$ in the aminophenol include, for example, methyl, ethyl, n-propyl, isopropyl, n-butyl, isobutyl, sec-butyl, tertiary (tert. or t-) butyl, pentyl, isopentyl, neopentyl, n-hexyl, sec-hexyl, t-hexyl, n-heptyl, isoheptyl, sec-heptyl, t-heptyl, n-octyl, isooctyl, sec-octyl, and t-octyl. Cycloalkyl groups which can be present as R, in the aminophenol include, for example, cyclopentyl, cyclohexyl and acyclic alkyl-substituted derivatives thereof, e.g. mono-, di- and tri-methyl cyclohexyl.

The ring-substituted N-acyl-para-aminophenol is preferably further substituted on the benzene ring of the phenol moiety with an independently selected second $R_1$ group, wherein $R_1$ is as defined and described above. The second $R_1$ group, where included, is preferably in the other position ortho to the hydroxyl group of the phenol moiety.

Included among the ring-substituted N-(aliphatic acyl)-para-aminophenols which may be employed as the stabilizer component are, for example:
(a) 2-t-butyl-4-(N-stearoyl)aminophenol,
(b) 2-t-butyl-4-(N-caproyl)aminophenol,
(c) 2-t-butyl-4-(N-valeroyl)aminophenol,
(d) 2-t-butyl-4-(N-nonanoyl)aminophenol,
(e) 2-t-butyl-4-(N-lauroyl)aminophenol,
(f) 2-t-butyl-4-(N-myristoyl)aminophenol,
(g) 2-t-butyl-4-(N-palmitoyl)aminophenol,
(h) 2-t-butyl-4-(N-oleoyl)aminophenol,
(i) the 2,6-di-t-butyl-4-(N-acyl)aminophenol analogs of each of the foregoing 2-t-butyl-compounds (a) to (h), preferably DTB-SPAP,
(j) the 6-alkylated derivatives of each of the foregoing 2-t-butyl compounds (a) to (h) wherein the alkyl group in the 6-position is any $R_1$ group other than t-butyl, where $R_1$ is as defined and described above, e.g. methyl, ethyl, isopentyl, etc.,
(k) the 2-alkylated homologues of each of the foregoing 2-t-butyl compounds (a) to (h) wherein the alkyl group in the 2-position is any $R_1$ group other than t-butyl, where $R_1$ is as defined and described above,
(l) the 2,6-di-alkyl homologues of each of the foregoing 2,6-di-t-butyl compounds (i) wherein the alkyl groups in the 2-position and the 6-position are any $R_1$ group other than t-butyl, where $R_1$ is as defined and described above.

The stabilizer component is preferably DTB-SPAP. Another preferred stabilizer component is a mixture of DTB-SPAP and its palmitoyl homolog, i.e. 2,6-di-t-butyl-4-(N-palmitoyl)aminophenol, in amounts thereof from about 1 to about 99% and about 99 to about 1%, respectively, and preferably containing approximately equal amounts by weight of these two compounds.

The stabilizer component may be included in any stabilizing amount, i.e. in any amount effective for improving the resistance of the polymeric composition to degradation, such as oxidative and thermal degradation. The stabilizer may be included in an amount, for example, per 100 parts by weight of the block copolymer, of from about 0.005 to about 10 parts by weight, preferably from about 0.005 to about 5 parts by weight and more preferably from about 0.1 to about 3 parts by weight.

The polymeric composition may optionally further contain a polyarene, preferably an "anionic polyarene"- i.e., a polyarene produced by the anionic polymerization of a monoalkenyl arene; a hydrocarbon rubber extending oil; and a finely divided filler. The optional polyarene may be and preferably is polystyrene such as that commonly employed in prior art formulations for footwear and termed typically "crystal grade polystyrene". This prior art crystal grade polystyrene is commercially produced almost exclusively by free radical polymerization. See Teach, Kiessling, Polystyrene, Reinhold Publishing Corp., Page 38 (1960). The catalyst employed in the free radical polymerization step is usually an organic peroxide. The present invention may employ a homopolymer of a monoalkenyl arene prepared by solution polymerization or mass polymerization with an organomonolithium initiator, e.g. phenylbutyllithium.

A method for preparing the anionic polyarene by a mass polymerization process in the absence of solvent is disclosed in U.S. Pat. No. 3,790,547. However, the anionic polyarene is preferably prepared by a solution polymerization process similar to the preferably employed process for preparing the block copolymers of the instant invention.

A much preferred process for preparing the anionic polyarene is to simultaneously prepare the polyarene and the block copolymer. The first step of this process involves contacting the monoalkenyl arene and the organomonolithium compound (initiator) in the presence of an inert diluent therein forming a living polymer compound having the simplified structure A-Li. The monoalkenyl arene is preferably styrene. Other useful monoalkenyl arenes from which the thermoplastic (non-elastomeric) blocks may be formed include alphamethyl stryene, tertbutyl styrene and other ring alkylated styrenes as well as mixtures of the same. The inert diluent may be an aromatic or naphthenic hydrocarbon, e.g., benzene or cyclohexane, which may be modified by the presence of an alkene or alkane such as pentenes or pentanes. Specific examples of suitable diluents include n-pentane, n-hexane isooctane, cyclohexane, toluene, benzene, xylene and the like. Such preferred method for producing the anionic polyarene is described in greater detail in Himes, U.S. Pat. No. 4,107,124 in the paragraph bridging columns 3 and 4 thereof.

Where an anionic polyarene is additionally included in the composition of this invention, the amount thereof may be from about 5 to about 125 phr, preferably from about 20 to about 90 phr. The term "phr" as used herein means parts by weight per 100 parts by weight of the block copolymer.

The optionally included hydrocarbon rubber extending oils, usually referred to as paraffinic/naphthenic oils, are usually fractions of refined petroleum products having less than about 30% by weight of aromatics (by claygel analysis) and usually have viscosities between about 100 and 500 SSU at 100° F. Commercial extending oils include SHELLFLEX® oils, Nos. 310, 371 and 372 (which is a blend of 310 and 371). The amount of extending oil employed may be from about 5 to about 175 phr, preferably from about 50 to about 125 phr.

Additional resins may also be employed in the present compositions. Suitable additional resins include, for example, flow-promoting resins which are compatible with the monoalkenyl arene end blocks of the block copolymer. Included among flow-promoting resins suitable herein are polymers of alphamethyl styrene, copolymers of alphamethyl styrene and vinyltoluene, coumarone-indene resins, polyindene resins, poly(methyl indene) resins and polystyrene resins of low molecular weight for flow promotion. The amount of end block compatible resin may be from about 0 to about 150 phr, preferably from about 5 to about 50 phr.

The fillers optionally included in the present composition may be any suitable filler. A number of fillers which are suitable herein are well known in the art, including for example, clay, talc, silica, titanium dioxide, carbon black, calcium carbonate, and other pigments as well as fibrous fillers such as cellulosic fibers, sawdust, ground cork, and the like. Preferred fillers include clay and calcium carbonate. The amount of filler may be from about 0 to about 250 phr, preferably from about 5 to about 60 phr.

The stabilizer compounds of this invention may be used alone or in combination with other stabilizers or additive materials, such as dilauryl-beta-thiodipropionate and distearyl-beta-thiodipropionate.

Other antioxidants, antiozonants, thermal stabilizers, ultraviolet light absorbers, coloring materials, dyes, pigments, metal chelating agents, etc. may be included in the composition.

The components of the composition of this invention may be combined by any suitable process. Numerous processes suitable herein are well known in the art, including blending, such as by extrusion, Banbury mixing or by dry-blending. In the latter case, it is preferred that the block copolymer and polyarene (if included) be formed or ground in particles having an average size less than about 4 millimeters (diameter) onto which the extending oil (if included) is absorbed. Following this, the remaining components may be added in pulverulent form and vigorously dry-blended with the particulate block copolymer or oil-extended block copolymer using well-known dry-blending equipment long used in the PVC dry-blending art.

The stabilized compositions of the present invention may be employed in any of the well-known applications of heretofore known polymeric compositions containing polymers of the type described herein. Such applications or end uses include, for example, footwear components, automotive parts, wire and cable coatings, adhesives, tubular products such as hoses and the like.

Footwear components in which the compositions of this invention may be employed include, for example, soling prepared by injection molding and slab soling, such as soling produced by cutting shoe sole forms from extruded slab-stock.

Practice of the present invention is illustrated by the following non-limiting examples. All parts, percents and other amounts given through this disclosure, including the examples which follow, are by weight unless otherwise indicated.

EXAMPLE 1

Kraton D4122 (an oil-extended polystyrene-polybutadiene-polystyrene block copolymer commercially available from Shell Chemical Company, Houston, Texas, extended with typically 35 percent of a plasticizer oil and typically having a polystyrene:polybutadiene weight ratio of about 48:52) was employed as the block copolymer in this example.

Three polymeric compositions, each consisting of or containing the block copolymer, were processed in a Brabender Torque Rheometer mixing head. the first composition (Control No. 1) consisted of the block copolymer. The second composition was a blend (hereinafter Blend A-1) prepared by dry blending 100 parts of the block copolymer with 0.15 part of IRGANOX® 1010 (Ciba-Geiy Corporation, Ardsley, N.Y.). The dry blending was effected by stirring the copolymer with IRGANOX 1010 in the amounts set forth above. The third composition was a blend (hereinafter Blend B-1) prepared by dry blending 100 parts of the block copolymer with 0.15 part of DTB-SPAP (i.e. N-stearoyl-2,6-di-t-butyl-4-aminophenol). The same dry blending procedure was employed for both Blend A-1 and Blend B-1, the latter being a composition of this invention. Blend A-1 is also referred to as Control No. 2.

A processing amount (50 grams) of each of the three polymeric compositions, i.e. Control No. 1, Control No. 2 (Blend A-1) and Blend B-1, was separately processed in the Brabender Torque Rheometer mixing head for 5 minutes at 120° C. and 20 revolutions per minutes (RPM). The melt flow rate for each processed composition was measured in accordance with the test procedure of ASTM D1238, Condition E.

The foregoing processing and melt-flow-rate measurement procedure was repeated except that the processing conditions were as follows: 20 minutes, 200° C. and 50 RPM.

Three additional polymeric compositions were prepared by separately dry blending 0.15 part dilaurylthiodipropionate (DLTDP) and 0.20 part 2(2'-hydroxy-5'-methylphenyl)benzotriazole, an ultraviolet light stabilizer commercially available as Tinuvin P (Ciba Geigy Corp.), with (1) Control No. 1, (2) Control No. 2 (Blend A-1) and (3) Blend B-1 to form Control No. 1a, Control No. 2a (Blend A-2) and Blend B-2, respectively. The dry blending procedure set forth above was employed for preparing these three additional polymeric compositions. Thereafter, 50 grams of each of these three compositions was processed in the Brabender Torque Rheometer mixing head for 20 minutes at 200° C. and 50 RPM. The melt flow rate of these three additional compositions was measured after such processing.

Each of the nine processed compositions was compression molded into a 60 mil plaque. Each plaque was placed in a Hunter Lab Scan II Spectro Colorimeter and its Yellowness Index was measured.

The results of the above-mentioned measurements of melt flow rate and Yellowness Index are set forth in Table I.

TABLE I

| Antioxidant | Brabender Processing Conditions | | | Melt Flow Rate, g/10 min ASTM D1238 Condition E | Yellowness Index ASTM D1925 |
|---|---|---|---|---|---|
| | Temp. °C. | RPM | Time, Min. | | |
| None | 120 | 20 | 5 | 3.9 | 11.06 |
| | 200 | 50 | 20 | 20.5 | 35.13 |
| | 200 | 50 | 20 | 21.6* | 36.29* |
| IRGANOX ® 1010 | 120 | 20 | 5 | 4.0 | 10.00 |
| | 200 | 50 | 20 | 19.1 | 38.69 |
| | 200 | 50 | 20 | 19.7* | 35.48* |
| DTB-SPAP | 120 | 20 | 5 | 3.7 | 8.02 |
| | 200 | 50 | 20 | 12.9 | 36.63 |
| | 200 | 50 | 20 | 14.8* | 34.74* |

*contained 0.15 phr DLTDP and 0.20 phr Tinuvin P

The melt flow rate of samples of Control No. 2 (Blend B-1) and Blend A-1, processed for 20 minutes at 200° C. and 50 RPM, was determined as a function of time. These samples were held at 190° C. in the extrusion plastometer (melt indexer) for a total of 25 minutes. Measurements of melt flow rate were made at the following time intervals: 2.5 minutes (standard), 5, 12, 19 and 25 minutes. Resistance to degradation under static heating conditions was determined. The results are set forth in Table II.

TABLE II

| Antioxidant | Brabender Processing Conditions | | | Melt Flow Rate, g/10 min ASTM D1238 Condition E TIME IN PLASTOMETER | | | | |
|---|---|---|---|---|---|---|---|---|
| | Temp. °C. | RPM | Time, Min. | 2.5 min | 5 min | 12 min | 19 min | 25 min |
| IRGANOX ® 1010 | 200 | 50 | 20 | 19.1 | 18.0 | 17.7 | 17.5 | 16.9 |
| DTB-SPAP | 200 | 50 | 20 | 12.9 | 11.6 | 11.6 | 11.6 | 11.3 |

In all tests set forth in this example DTB-SPAP showed superior performance to IRGANOX ® 1010.

EXAMPLE 2

Kraton D4240 (an oil-extended polystyrene-polybutadiene-polystyrene block copolymer commercially available from Shell Chemical Company, Houston, Texas, extended with typically 46 percent of a plasticizer oil and typically having a polystyrene:polybutadiene weight ratio of about 44:56) was employed as the block copolymer in this example.

Three polymeric compositions, each consisting of or containing the block copolymer, were processed in a Brabender Torque Rheometer mixing head. The first composition (a first control) consisted of the block copolymer. The second composition was a blend (a second control) prepared by dry blending 100 parts of the block copolymer with 0.15 part of IRGANOX ® 1010 (Ciba-Geigy Corporation, Ardsley, New York). The dry blending was effected by stirring the copolymer with IRGANOX 1010 in the amounts set forth above. The third composition was a blend (a composition of this invention) prepared by dry blending 100 parts of the block copolymer with 0.15 part of DTB-SPAP (i.e. N-stearoyl-2,6-di-t-butyl-4-aminophenol). The same dry blending procedure was employed for both blends.

A processing amount (50 grams) of each of the three polymeric compositions was separately processed in the Brabender Torque Rheometer mixing head for 5 minutes at 120° C. and 20 revolutions per minutes (RPM). The foregoing processing procedure was repeated for an additional 50-gram amount of each of the three compositions except that the processing conditions were as follows: 20 minutes, 200° C. and 50 RPM.

The melt flow rate of each of the Brabender-processed samples was determined as a function of time in the melt indexer at 190° C. Melt flow rates were determined for each sample after 5, 12, 19 and 25 minutes at 190° C. The results are set forth in Table III. In each case the compositions containing DTB-SPAP had lower melt flow rate values than those containing IRGANOX ® 1010 or containing no antioxidant.

Each of the processed compositions was compression molded into 60 mil plaques. The yellowness index of each composition was determined using a Hunter Lab Scan II Spectro Colorimeter. The results are also set forth in Table III. As the results indicate, the compositions containing DTB-SPAP remained less yellow than the compositions containing IRGANOX ® 1010. Processing at 200° C. without any antioxidant present produced the most intense yellow color in this series.

TABLE III

| Antioxidant | Melt Flow Rate, g/10 min ASTM D1238 Condition E TIME IN PLASTOMETER | | | | Yellowness Index ASTM D1925 |
|---|---|---|---|---|---|
| | 5 min | 12 min | 19 min | 25 min | |
| None | 3.0 | 2.9 | 2.9 | 3.0 | 6.89 |
| | 6.6 | 6.1 | 5.7 | 5.3 | 11.99 |
| IRGANOX ® 1010 | 2.9 | 3.1 | 3.1 | 3.1 | 8.27 |
| | 7.6 | 7.2 | 6.8 | 6.6 | 10.51 |
| DTB-SPAP | 2.8 | 2.9 | 2.7 | 2.8 | 7.61 |
| | 5.7 | 5.5 | 5.5 | 5.3 | 9.07 |

EXAMPLE 3

In a manner similar to that described in Example 2, the effect of antioxidants IRGANOX ® 1010 and DTB-SPAP on the processibility of Kraton D5298 (a styrene-butadiene-styrene block copolymer, Shell Chemical Company) was examined. The effect of antioxidant level (0.15 phr, 0.25 phr and 0.40 phr) as well as processing time (5 min, 10 min and 20 min), processing temperature (120° C. and 20° C.) and time in plastometer (5 min, 12 min, 19 min and 25 min) on melt flow rate and color were examined. Melt flow rate results are set forth in Table IV and Yellowness Index results are set forth in Table V. The results show better color retention and better resistance to changes in melt flow rate for the compositions containing DTB-SPAP.

TABLE IV

| Antioxidant | Brabender Processing Conditions | | | | Melt Flow Rate, g/10 min ASTM D1238 Condition E | | | |
|---|---|---|---|---|---|---|---|---|
| | Temp. °C. | RPM | Time, Min. | Level phr* | TIME IN PLASTOMETER | | | |
| | | | | | 5 min | 12 min | 19 min | 25 min |
| None | 120 | 20 | 5 | — | 10.7 | 12.9 | 14.6 | 15.6 |
| | 120 | 20 | 10 | — | 11.2 | 13.6 | 15.6 | 16.6 |
| | 200 | 50 | 20 | — | 16.3 | 22.5 | 23.6 | 24.0 |
| IRGANOX ® 1010 | 120 | 20 | 5 | 0.15 | 12.0 | 15.3 | 16.3 | 16.7 |
| | 120 | 20 | 10 | 0.15 | 9.8 | 11.2 | 16.3 | 16.3 |
| | 200 | 50 | 20 | 0.15 | 18.5 | 23.3 | 23.6 | — |
| | 200 | 50 | 20 | 0.25 | 19.0 | 23.0 | 24.1 | — |
| | 200 | 50 | 20 | 0.40 | 21.0 | 25.6 | — | — |
| DTB-SPAP | 120 | 20 | 5 | 0.15 | 10.3 | 12.5 | 14.9 | 15.2 |
| | 120 | 20 | 10 | 0.15 | 9.9 | 12.7 | 14.4 | 15.9 |
| | 200 | 50 | 20 | 0.15 | 14.7 | 17.9 | 20.1 | 21.1 |
| | 200 | 50 | 20 | 0.25 | 14.5 | 16.8 | 18.1 | 20.3 |
| | 200 | 50 | 20 | 0.40 | 15.5 | 20.3 | 21.8 | — |

*The term "phr" means parts per 100 parts of the block copolymer

TABLE V

| Antioxidant | Brabender Processing Conditions | | | | Yellowness Index ASTM D1925 |
|---|---|---|---|---|---|
| | Temp. °C. | RPM | Time, Min. | Level phr* | |
| None | 120 | 20 | 5 | — | 8.37 |
| | 200 | 50 | 20 | — | 29.39 |
| IRGANOX ® 1010 | 120 | 20 | 5 | 0.15 | 4.82 |
| | 200 | 50 | 20 | 0.15 | 21.54 |
| | 200 | 50 | 20 | 0.25 | 19.67 |
| DTB-SPAP | 120 | 20 | 5 | 0.15 | 5.11 |
| | 200 | 50 | 20 | 0.15 | 19.30 |
| | 200 | 50 | 20 | 0.25 | 15.37 |

*The term "phr" means part per 100 parts of the block copolymer.

EXAMPLE 4

50.0 g of Kraton D-1107 (a polystyrene:polyisoprene-polystyrene block copolymer commercially available from Shell Chemical Company and typically having a polystyrene:polyisoprene weight ratio of 14:86) was added to each of two round bottom flasks. Separate beaker-contained solutions of 0.50 g of the below-indicated antioxidant in 25 ml of $CH_3OH$ and the washings were added to the respective flasks. The resulting mixtures were stirred for 10 minutes at about 50° C. and the solvent was removed via rotary evaporation. Three 12.0 g samples were placed in aluminum trays and placed in a 150° air circulating oven for 15, 30 and 60 minutes. 7.50 g samples of each trial were then placed in a 190° C. plastometer with 2160 g weight and a 60-second sample taken at 5 and 10 minute intervals. This data was converted to melt flow values as reported below and the appearance was observed.

| Antioxidant | Melt Flow g/10 min 60 minutes at 150° C. | Appearance after 60 minutes at 150° C. |
|---|---|---|
| IRGANOX ® 1010 | 9.1 | dark brown, melted sticky |
| DTB-SPAP | 7.0 | light brown, slightly melted, not sticky |
| None | 14.4 | dark brown, completely melted, very sticky |

As shown by the foregoing examples, compositions stabilized with the antioxidant employed in this invention have greater resistance to degradation, e.g. oxidative and thermal degradation, as shown by the better appearance (e.g. lower yellowness index values) and lower melt flow rate values observed therefor.

BEST MODE CONTEMPLATED

The best mode contemplated for carrying out this invention has been set forth in the above description, for example, by way of setting forth preferred materials and operating conditions, including but not limited to preferred ranges and values of amounts and other nonobvious variables material to successfully practicing the invention in the best way contemplated at the time of executing this patent application.

It is understood that the foregoing detailed description is given merely by way of illustration and that many modifications may be made therein without departing from the spirit or scope of the present invention.

What is claimed is:

1. A stabilized polymeric composition comprising:
   (A) a block copolymer having at least 2 monoalkenyl arene polymer end blocks A and at least one elastomeric conjugated diene internal block B, said blocks A comprising from about 8 to about 65% by weight of the copolymer; and
   (B) a stabilizing amount of a stabilizer, said stabilizer being a ring substituted N-(aliphatic acyl)-para-aminophenol containing at least one substituent $R_1$ in the ortho position relative to the hydroxyl group of the phenol moiety, wherein the aliphatic acyl group contains from about 2 to about 22 carbon atoms and $R_1$ is an alkyl group selected from alkyl groups containing from 1 to about 8 carbon atoms and cycloalkyl groups containing from 5 to about 12 carbon atoms.

2. The composition of claim 1 wherein $R_1$ is a tertiary alkyl group.

3. The composition of claim 2 wherein $R_1$ is t-butyl.

4. The composition of claim 1 wherein the benzene ring of the aminophenol is further substituted with an independently selected second $R_1$ group, wherein $R_1$ is as defined above.

5. The composition of claim 4 wherein said second $R_1$ group is in the other position ortho to the hydroxyl group.

6. The composition of claim 5 wherein said second $R_1$ group is t-butyl.

7. The composition of claim 6 wherein said aminophenol is 2,6-di-t-butyl-4-(N-stearoyl)aminophenol.

8. The composition of claim 1 wherein the acyl group contains from about 14 to about 18 carbon atoms.

9. The composition of claim 8 wherein said acyl group is stearoyl.

10. The composition of claim 8 wherein said acyl group is palmitoyl.

11. The composition of claim 1 wherein said stabilizer is a mixture of 2,6-di-t-butyl-4-(N-stearoyl) aminophenol and 2,6-di-t-butyl-4-(N-palmitoyl) aminophenol.

12. The composition of claim 1 wherein said antioxidant compound is present in an amount from about 0.005 to about 10 parts by weight per 100 parts by weight of said block copolymer.

13. The composition of claim 1 wherein said internal block B is a polybutadiene block.

14. The composition of claim 13 wherein said polymer end blocks A are polystyrene blocks.

15. The composition of claim 1 wherein said internal block B is a polyisoprene block.

16. The composition of claim 15 wherein said polymer end blocks A are polystyrene blocks.

17. The composition of claim 1 wherein said polymer end blocks A are polystyrene blocks.

18. The composition of claim 7 wherein said internal block B is a polybutadiene block and said polymer end blocks A are polystyrene blocks.

19. The composition of claim 18 wherein said block copolymer is polystyrene-polybutadiene-polystyrene.

20. The composition of claim 7 wherein said internal block B is a polyisoprene block and said polymer end blocks A are polystyrene blocks.

21. The composition of claim 20 wherein said block copolymer is polystyrene-polyisoprene-polystyrene.

* * * * *